[8.]

Oliver Salgee.
Impt. in Coupling-Faucets.
No. 119.243    Patented Sep. 26, 1871.

Witnesses,

Thos H Smith
Geo. D. Walker.

Oliver Salgee
L. W. Serrell
atty.

UNITED STATES PATENT OFFICE.

OLIVER SALGEE, OF BROOKLYN, NEW YORK.

IMPROVEMENT IN COUPLING-FAUCETS.

Specification forming part of Letters Patent No. 119,243, dated September 26, 1871.

*To all whom it may concern:*

Be it known that I, OLIVER SALGEE, of the city of Brooklyn, in the county of Kings and State of New York, have invented an Improvement in Coupling-Faucets; and the following is declared to be a correct description thereof.

Faucets for beer-barrels have been made with a tapering end, to be driven into the bung-hole and screwed into the same tightly; and to such faucets the tube leading to the fountain or drawing-faucet has been connected. These faucets, however, are costly and liable to get out of repair. I make use of a valve opening inward and introduced in the plug, in combination with a coupling-screw and thimble, in such a manner that the screwing in of the coupling opens the valve of the faucet to allow the contents of the barrel to pass off by said tube. The valve is self-closing upon the coupling being detached. The seat of the valve is made movable, and the leather surface of the seat is clamped around its edges by screwing the seat to place.

Figure 2:
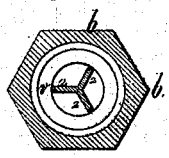
Figure 1:
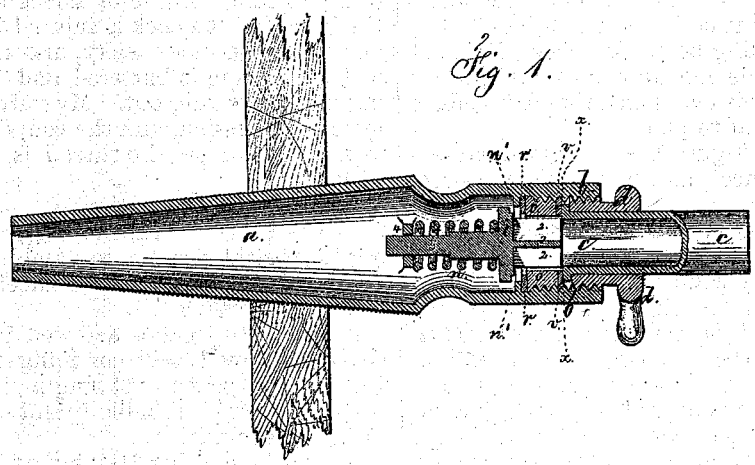

In the drawing, Figure 1 is a longitudinal section of the said faucet, and Fig. 2 is a cross-section at the line $x\ x$.

The tapering plug $a$, with a screw-thread upon its surface, is of the usual character. $b$ is the female screw for the coupling-thimble $c$ and ring $d$; and these parts are either in line with the plug $a$ or at an angle thereto, as required for the direction in which the pipe is to pass away from the thimble $c$. The valve $i$ is made with guide-wings 2 2 2 in the opening through the valve-seat $o$, and also with a stem, 3, passing through a bridge or guide, 4; and around the stem is the expansive spring $n$, to close the valve $i$ against the seat $o$ when the coupling-thimble $c$ and ring $d$ are loosened or removed; but when these are screwed into place the end of the thimble, acting against the wings 2, opens the valve, so that the communication through the faucet and coupling is complete. By this means the separate key or cock of the faucet is dispensed with. The leather face $r$ of the valve-seat $o$ is confined at its edges between said seat $o$ and the ring $n'$, and the valve-seat $o$ is movable, so as to be screwed into the female coupling-screw $b$ and clamp the edges of the elastic valve-seat $r$. By making the ring $n'$ a fixture in the inside of the faucet, and of a diameter to freely admit the valve $i$ to pass through the same, I am enabled to introduce the whole of the parts through the screw-cylinder $b$, thereby lessening the cost and rendering any second opening unnecessary. The washer $v$ makes a tight joint between the thimble $c$ and the valve-seat $o$.

The coupling-faucets heretofore made are liable to injury in driving in or knocking out, because the barrel of the cock is injured by compression and hence becomes leaky, and the male thread of the coupling is battered and injured in driving in or knocking out. My valve is not injured by the concussion, and the coupling being made as a female screw the thread is protected from injury.

I claim as my invention—

1. The valve $i$, with the wings 2 in the opening through the seat $o$, in combination with the thimble $c$ and ring $d$ of the faucet, as and for the purposes set forth.

2. The valve-seat $o$, screwed into the female coupling-screw $b$, and confining the elastic surface $r$ of the seat to the ring $n'$, in combination with the valve $i$, thimble $c$, and ring $d$, substantially as set forth.

Signed by me this 31st day of January, A. D. 1871.

OLIVER SALGEE.

Witnesses:
HAROLD SERRELL,
GEO. T. PINCKNEY.